(12) United States Patent
Iscoe et al.

(10) Patent No.: US 10,048,940 B2
(45) Date of Patent: Aug. 14, 2018

(54) PARALLEL GENERATION OF RANDOM NUMBERS

(71) Applicant: INTERNATIONAL BUSINESS MACHINES CORPORATION, Armonk, NY (US)

(72) Inventors: Ian S. Iscoe, Ontario (CA); Asif Lakhany, Ontario (CA)

(73) Assignee: International Business Machines Corporation, Armonk, NY (US)

(*) Notice: Subject to any disclaimer, the term of this patent is extended or adjusted under 35 U.S.C. 154(b) by 51 days.

(21) Appl. No.: 15/170,984

(22) Filed: Jun. 2, 2016

(65) Prior Publication Data
US 2017/0351489 A1    Dec. 7, 2017

(51) Int. Cl.
G06F 7/58    (2006.01)

(52) U.S. Cl.
CPC .................... *G06F 7/588* (2013.01)

(58) Field of Classification Search
None
See application file for complete search history.

(56) References Cited

U.S. PATENT DOCUMENTS

| | | | | |
|---|---|---|---|---|
| 6,487,571 B1* | 11/2002 | Voldman | ........... | G06F 7/588 |
| | | | | 708/250 |
| 8,756,264 B2* | 6/2014 | Sussman | ........... | G06F 7/582 |
| | | | | 708/253 |
| 2005/0010319 A1* | 1/2005 | Patel | ........... | G05B 13/048 |
| | | | | 700/121 |
| 2010/0070549 A1* | 3/2010 | Nagaraj | ........... | G06F 7/588 |
| | | | | 708/254 |
| 2012/0323551 A1 | 12/2012 | Beyer et al. | | |
| 2014/0136583 A1 | 5/2014 | Hyde et al. | | |
| 2015/0095389 A1 | 4/2015 | Steele | | |
| 2016/0162262 A1* | 6/2016 | Tredak | ........... | G06F 7/586 |
| | | | | 708/256 |

(Continued)

OTHER PUBLICATIONS

Alerstam et al., "Parallel computing with graphics processing units for high-speed Monte Carlo simulation of photon migration," Journal of Biomedical Optics, vol. 13, Issue 6, Nov. 2008, © 2008 SPIE, pp. 1-3.

(Continued)

*Primary Examiner* — David H Malzahn
(74) *Attorney, Agent, or Firm* — Robert D. Bean (57) ABSTRACT

Parallelized generation of random numbers. A vector, in a memory component, is allocated that is configured to store a sequence of random numbers. A first thread of a plurality of threads is assigned to a first random number generator of a plurality of random number generators. A second thread of the plurality of threads is assigned to a second random number generator of the plurality of random number generators. A first random number designated for a first index position in the sequence of random numbers and a second random number designated for a second index position in the sequence of random numbers are generated in parallel by the first and second thread, respectively. The first random number in the first index position of the sequence of random numbers and the second random number in the second index position of the sequence of random numbers are stored in the allocated vector.

19 Claims, 8 Drawing Sheets

(56) References Cited

U.S. PATENT DOCUMENTS

2016/0328209 A1* 11/2016 Pape .................... G06F 7/58
2017/0102922 A1* 4/2017 Steele, Jr. ............. G06F 7/586

OTHER PUBLICATIONS

Lee et al., "On the utility of graphics cards to perform massively parallel simulation of advanced Monte Carlo methods," Journal of Computational and Graphical Statistics, vol. 19, Issue 4, 2010, Taylor and Francis Online, pp. 1-19.

Matsumoto et al., "Dynamic Creation of Pseudorandom Number Generators," Proceedings of the Third International Conference on Monte Carlo and Quasi-Monte Carlo Methods in Scientific Computing, Jun. 1998, pp. 1-14.

L'Ecuyer et al., "An Object-Oriented Random-Number Package With Many Long Streams and Substreams," Journal Operations Research, vol. 50, Issue 6, Nov. 2002, pp. 1073-1075.

Mell et al., "The NIST Definition of Cloud Computing", National Institute of Standards and Technology, Special Publication 800-145, Sep. 2011, pp. 1-7.

Anderson, "Random Number Generators on Vector Supercomputers and Other Advanced Architectures", SIAM Review, vol. 32, No. 2, (Jun. 1990), pp. 221-251.

L'Ecuyer, "Random Numbers for Simulation", Communications of the ACM, vol. 33, No. 10, pp. 85-97 (Oct. 1990).

L'Ecuyer, "Good Parameters and Implementations for Combined Multiple Recursive Random Number Generators", Operations Research, vol. 47, No. 1, pp. 159-164 (Feb. 1999).

L'Ecuyer et al. "rstream: Streams of Random Numbers For Stochastic Simulation", www.iro.umontreal.cat/~lecuyer/myftp/papers/rstream.pdf (Accessed Jun. 25, 2014).

L'Ecuyer et al., "An Object-Oriented Random-Number Package with Many Long Streams and Substreams", Operations Research, vol. 50, No. 6, pp. 1073-1075, (Nov.-Dec. 2002).

Matsumoto et al. "A 623-Dimensionally Equidistributed Uniform Pseudorandom Number Generator", www.math.sci.hiroshima-u.ac.jp/~m-mat/MT/ARTICLES/mt.pdf, 1998, pp. 1-13.

Matsumoto et al. "Dynamic Creation of Pseudorandom Number Generators", www.math.sci.hiroshima-u.ac.jp/~m-mat/MT/DT/dgene.pdf (Accessed Jun. 25, 2014).

Fishman et al., "An Exhaustive Analysis of Multiplicative Congruential Randon Number Generators with Modulus 2 (31)-1," https://doi.org/10.1137/0907002, ISIAM Journal on Scientific and Statistical Computing, vol. 7, No. 1, 1986, University of North Carolina at Chapel Hill, DTIC ELECTE, Jul. 11, 1984, pp. 1-53.

* cited by examiner

| THREAD 0 | | THREAD 1 | | THREAD 2 | | THREAD 3 | |
|---|---|---|---|---|---|---|---|
| Generator | Index | Generator | Index | Generator | Index | Generator | Index |
| 0 | 0 | 1 | 1 | 2 | 2 | 3 | 3 |
| 4 | 4 | 1 | 6 | 2 | 7 | 3 | 8 |
| 0 | 5 | 1 | 11 | 2 | 12 | 3 | 13 |
| 4 | 9 | 1 | 16 | 2 | 17 | 3 | 18 |
| 0 | 10 | 1 | 21 | 2 | 22 | 3 | 23 |
| 4 | 14 | | | | | | |
| 0 | 15 | | | | | | |
| 4 | 19 | | | | | | |
| 0 | 20 | | | | | | |
| 4 | 24 | | | | | | |
| 0 | 25 | | | | | | |

FIG. 4

| THREAD 0 | | THREAD 1 | | THREAD 2 | | THREAD 3 | |
|---|---|---|---|---|---|---|---|
| Generator | Index | Generator | Index | Generator | Index | Generator | Index |
| 0 | 0 | 1 | 1 | 2 | 2 | 3 | 3 |
| 4 | 4 | 0 | 5 | 1 | 6 | 2 | 7 |
| 3 | 8 | 4 | 9 | 0 | 10 | 1 | 11 |
| 2 | 12 | 3 | 13 | 4 | 14 | 0 | 15 |
| 1 | 16 | 2 | 17 | 3 | 18 | 4 | 19 |
| 0 | 20 | 1 | 21 | 2 | 22 | 3 | 23 |
| 4 | 24 | 0 | 25 | | | | |

PARALLEL GENERATION OF RANDOM NUMBERS

FIELD OF THE INVENTION

The present invention relates generally to the field of random number generation, and more particularly to generating random numbers in parallel.

SUMMARY

Embodiments of the present invention provide systems, methods, and computer program products for parallelized generation of random numbers. A vector, in a memory component, is allocated that is configured to store a sequence of random numbers. A first thread of a plurality of threads is assigned to a first random number generator of a plurality of random number generators. A second thread of the plurality of threads is assigned to a second random number generator of the plurality of random number generators. A first random number designated for a first index position in the sequence of random numbers and a second random number designated for a second index position in the sequence of random numbers are generated in parallel by the first and second thread, respectively. The first random number in the first index position of the sequence of random numbers and the second random number in the second index position of the sequence of random numbers are stored in the allocated vector.

DETAILED DESCRIPTION

Various applications can implement a computer system that generates random numbers in parallel to aid in computationally demanding decision making involving generated sequences of random numbers. For example, a financial risk management application may require parallelized generation of random numbers to make business decisions, such as price estimation. Typically, a computer system can generate random numbers in parallel, such that each thread of the computer system uses the same random number generator initialized with a starting point, or seed, to generate an element (i.e., a random number) in the generated sequence of random numbers.

If each thread of a computer system uses the same random number generator initialized with a different seed, then elements in the sequence of random number generated by the computer system may exhibit codependence. That is, random number sequences generated using a typical parallelized random number generation technique may have overlapping portions, including elements that repeat after a given period, in the random number sequence. For example, a first thread and a second thread of a computer system can generate two sequences of random numbers using a random number generator, such that the first thread and the second thread use the random number generator initialized by a first seed, $A_0$, and the second seed, $B_0$, respectively. A sequence of random numbers, $A_j$, generated by the first thread may include an element, $A_m$, where $A_m$ is equal to an element $B_n$. Accordingly, a random number sequence, $B_j$, generated by the second thread includes the same elements in the same order as an overlapping portion of the random number sequence, $A_j$, where the overlapping portion of $A_j$ begins at element $A_m$ and the overlapping portion of $B_j$ begins at element $B_n$.

Sequences of random numbers whose elements exhibit codependence can be undesirable for many applications and typically have a higher number of failures in tests for statistical randomness (e.g., frequency test, serial test, poker test, gap test, etc.). According to embodiments of the present invention, computer systems can implement an alternative technique to generate random numbers in parallel, such that generated sequences of random numbers are not codependent, as described in greater detail below. For example, an allocation component of a computer system can be used to assign tasks to one or more threads of the computer system, where each task involves a thread that generates an element for a sequence of random numbers using one random number generator from a collection of random number generators. Accordingly, each element in a sequence of a random number is independently generated by a thread using one of a collection of random number generators.

Embodiments of the present invention provide methods, systems, and computer program products for parallelized generation of random numbers. Embodiments of the present invention can generate a sequence of random numbers, by allocating tasks to threads of a computer system, such that each thread uses a one of a collection of participating random number generators to generate elements for a sequence of random numbers.

Generally, a computer system having threads can use a collection of participating random number generators to generate random numbers, or elements, for a sequence of random numbers in parallel. A destination vector in a memory component can be allocated and populated with generated elements for a sequence of random numbers. Once each of the threads completes allocated tasks for parallelized random number generation, the resulting destination vector contains a completed sequence of random numbers that can be used in subsequent processing and analysis.

Figure 1:
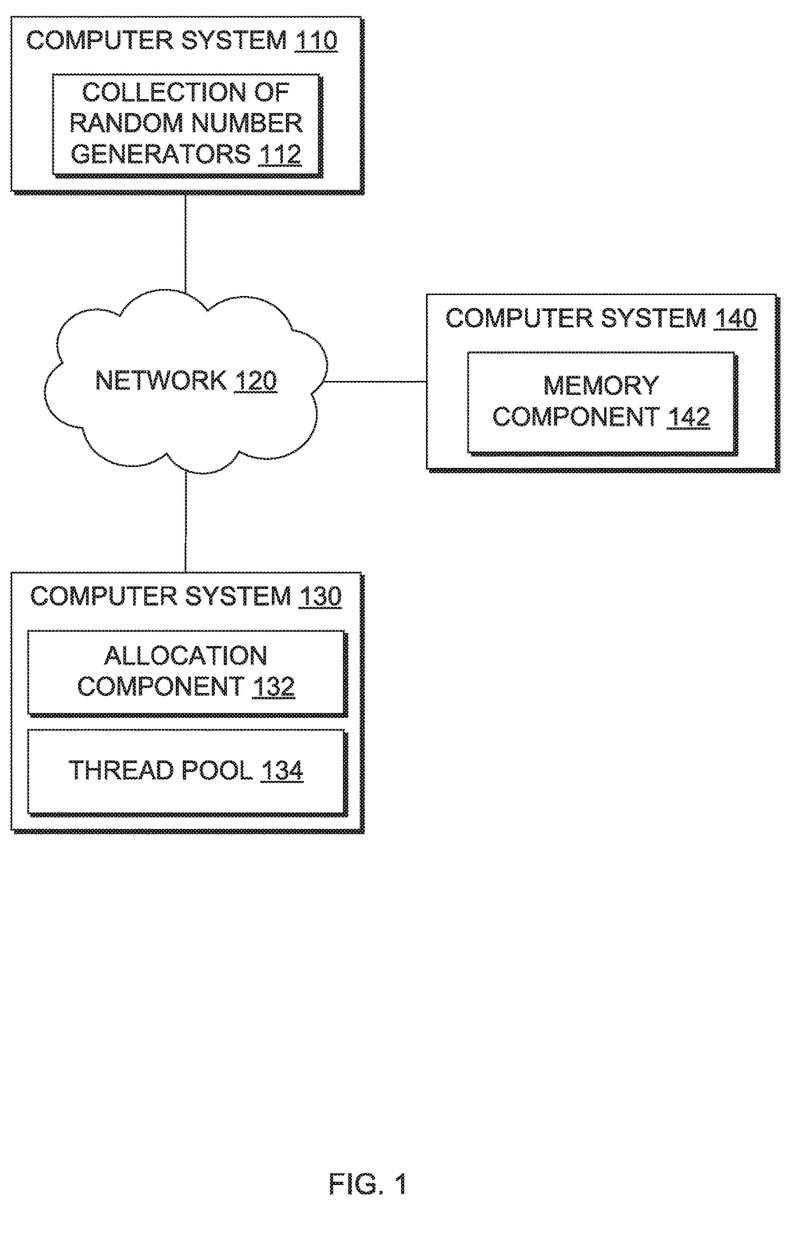
FIG. 1 is a block diagram of a random number generation environment, in accordance with an embodiment of the present invention.

FIG. 1 is a block diagram of random number generation environment 100, in accordance with an embodiment of the present invention. Random number generation environment 100 includes computer system 110, computer system 130, and computer system 140, which are connected via network 120. Computer system 110, computer system 130, and computer system 140 can be desktop computers, laptop computers, specialized computer servers, or any other computer systems known in the art. In certain embodiments, computer system 110, computer system 130, and computer system 140 represent computer systems utilizing clustered computers and components to act as a single pool of seamless resources when accessed through network 120. For example, such embodiments may be used in data center, cloud computing, storage area network (SAN), and network attached storage (NAS) applications. In certain embodiments, computer system 110, computer system 130, and computer system 140 represent virtual machines. In general, computer system 110, computer system 130, and computer system 140 are representative of electronic devices, or combination of electronic devices, capable of executing machine-readable program instructions, in accordance with an embodiment of the present invention, as described in greater detail with regard to FIG. 6. Random number generation environment 100 can include a greater or lesser number of computer systems similar to that of computer system 110, computer system 130, and computer system 140 that are connected via network 120. In other embodiments, computer system 110, computer system 130, and computer system 140 may be implemented in a cloud computing environment, as described in greater detail with regard to FIGS. 7 and 8.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between computer system 110, computer system 130, and computer system 140, in accordance with an embodiment of the invention.

Computer system 110 represents a platform for managing a collection of random number generators 112. In this embodiment, the collection of random number generators 112 includes a list of participating random number generators, such as Multiplicative Linear Congruential Generators (MLCGs) or Linear Congruential Generators (LCGs). For example, the collection of random number generators 112 may include MLCGs provided by Fishman, G. S. and Moore III, L. S. In one embodiment, computer system 110 can store executable program instructions for each of the collection of random number generators 112 in an array, such as a lookup table, as well as a state of each of the collection of random number generators 112, such that if an executable program instruction for a particular random number generator from the collection of random number generators 112 is executed, then a random number is generated. Computer system 110 can identify each random number generator in the collection of random number generators 112 by referencing a respective index value. For example, G is the collection of random number generators 112, where $G=\{G_i, i=1, \ldots, K\}$, and K is the number of participating random number generators, then computer system 110 can identify a first in the collection of random number generators 112 by referencing the respective index value (e.g., an index value, $G_1$). In another embodiment, the collection of random number generators 112 can include any number participating random number generators having limited failures for empirical statistical testing of uniform random number generators (e.g., Big Crush, Small Crush, and Crush offered by TESTU01).

Computer system 130 represents a platform for transmitting generated random numbers, or generated elements for a sequence of random numbers, to computer system 130. In this embodiment, computer system 130 includes allocation component 132 and thread pool 134 to generate elements, as described in greater detail below.

Allocation component 132 represents program functionality for allocating tasks to threads from thread pool 134. In another embodiment, allocation component 132 represents program functionality for allocating specified random number generators from the collection of random number generators 112 to threads from thread pool 134. The term 'task,' as used herein, refers to a computational operation performed by a thread that involves generating an element for a sequence of random numbers (i.e., random number) using one of the participating random number generators from the collection of random number generators 112. A thread from thread pool 134 can be identified by allocation component 132 and then allocation component 132 can allocate a task to the identified thread. Allocation component 132 can also allocate a destination vector in a storage resource that stores generated elements, as described in greater detail below. For example, allocation component 132 can allocate a task to an identified thread from thread pool 134 that involves generating a third element of a sequence of random numbers stored in an allocated destination vector, using a specified one of the collection of random number generators 112. Allocation component 132 can manage counters used to determine whether a desired number of elements for a sequence of random numbers have been generated, as described in greater detail with regard to FIGS. 2A, 2B, and 3. Allocation component 132 can also ensure optimal load balancing amongst threads in thread pool 134 through thread synchronization, as described in greater detail with regard to FIG. 3.

Thread pool 134 represents a collection of threads that can be managed by a component of computer system 130, such as a scheduler. As previously described, allocation component 132 can allocate tasks to each thread from thread pool 134 to generate elements. In this embodiment, thread pool 134 consists of any number of threads that can perform tasks in parallel. For example, five tasks can be performed by threads from thread pool 134 to generate five elements, such that allocation component 132 allocates a first of the five tasks to a first thread from thread pool 132, allocates a second of the five tasks to a second thread from thread pool 132, etc. Each thread from thread pool 134 can be identified by referencing a thread identifier, such as an index value, associated with each respective thread. For example, P is thread pool 134, where $P=\{P_i, i=1, \ldots, T\}$, and T is the number of threads in thread pool 134, then allocation component 132 can identify a first thread in thread pool 134 by referencing the thread identifier (e.g., an index value, $P_1$).

Computer system 140 represents a platform for receiving generated elements from computer system 130 and populating an allocated destination vector in memory component 142 with the generated elements. In this embodiment, computer system 140 is configured to perform memory management operations, such as memory allocation and deallocation. Memory component 142 represents a storage resource allocated by allocation component 132 of computer system 130. Once allocation component 142 determines that all elements have been generated for a desired sequence of random number and are stored in a destination vector of memory component 142, then allocation component 142 can designate another destination vector, such that computer system 140 receives elements for another desired sequence of random numbers can populate the other destination vector. In one embodiment, allocation component 132 allocates a destination vector having a specified size, such that the destination vector is configured to store N number of desired elements.

In another embodiment, platform and program functionality of computer systems 110, 130, and 140 and components therein can be part of a greater or lesser number of computer systems illustrated in FIG. 1. For example, a single computer system can contain the collection of random number generators 112, allocation component 132, thread pool 134, and memory component 142. In another example, each computer system in a cluster of computer systems may be considered a thread configured to independently perform tasks to generate elements for a sequence of random numbers stored in a separate computer system. The term, 'element,' as used herein, refers to a single numerical value generated from one of the collection of random number generators 112 specified by an allocated task to be performed by an specified thread from thread pool 134.

Figure 2A:
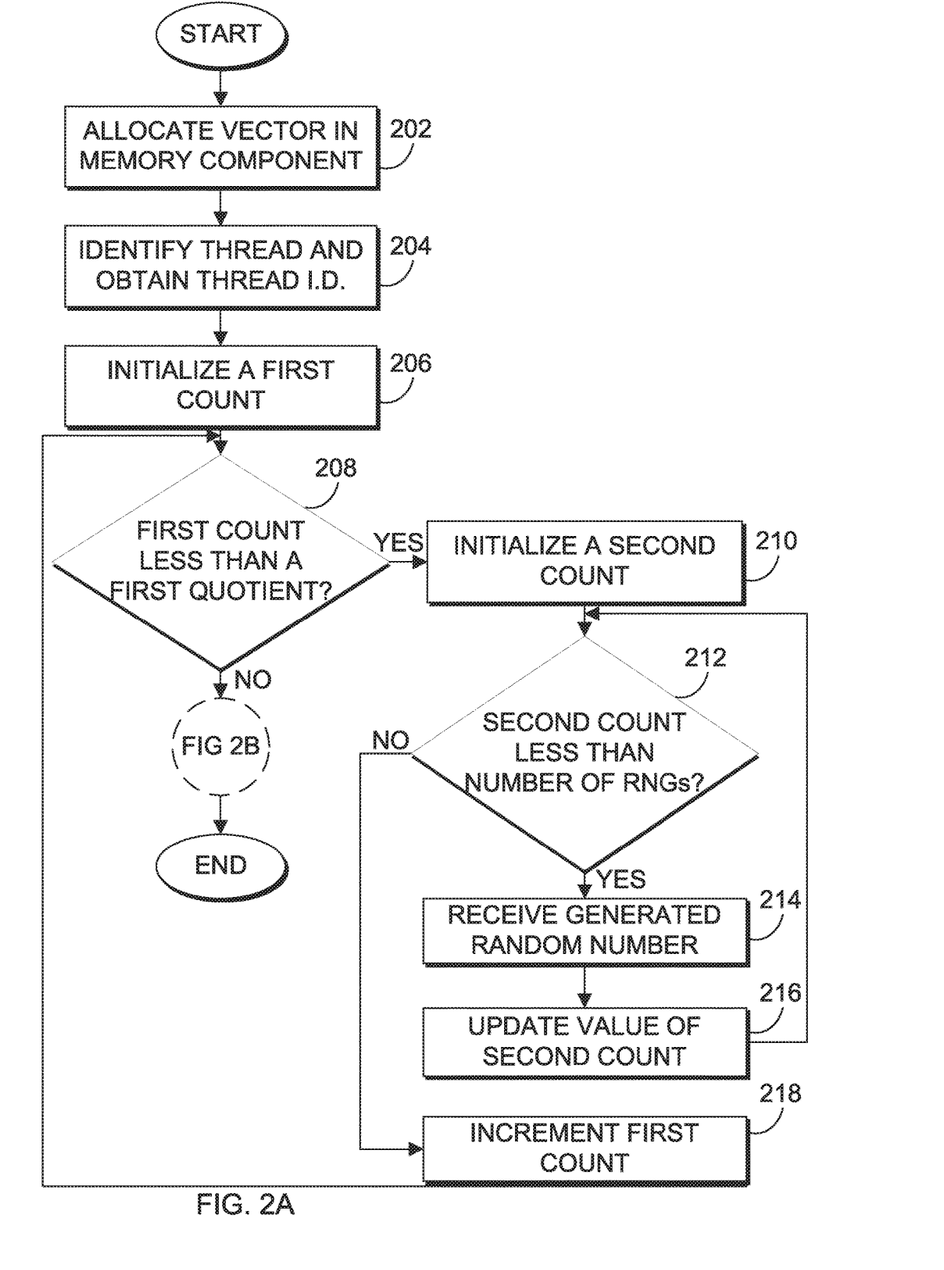
FIGS. 2A and 2B are flowcharts illustrating operational steps for generating elements for a sequence of random numbers, in accordance with an embodiment of the present invention.
Figure 2B:
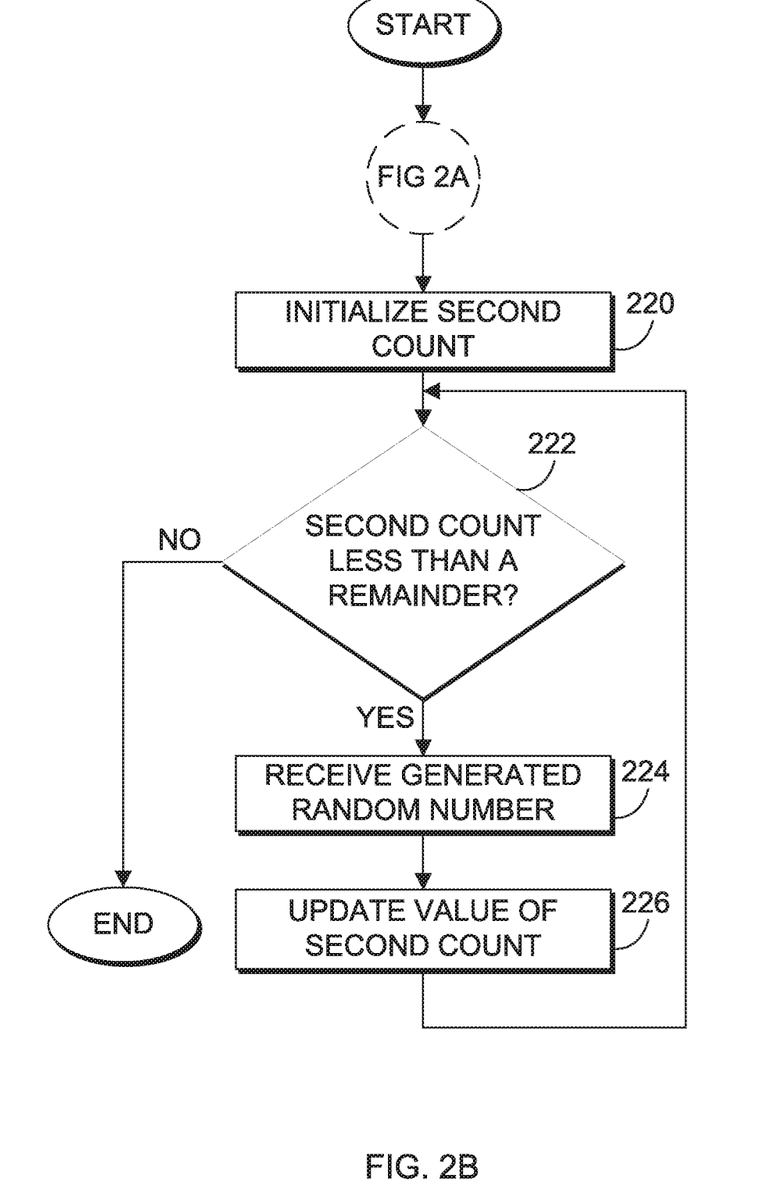

FIGS. 2A and 2B are flowcharts illustrating operational steps for generating elements for a sequence of random numbers, in accordance with an embodiment of the present invention. In this embodiment, FIGS. 2A and 2B illustrate operational steps parallelized generation of random numbers using a first algorithm, having pseudo-code illustrated in Table 1 below. In another embodiment, other operational steps for generating random elements for a sequence of random numbers can be performed. For example, any allocation mechanism can be implemented such that specified random number generators from the collection of random number generators 112 are allocated to threads of thread pool 134, and/or vice versa.

In this embodiment, allocation component 132 allocates a destination vector in memory component 142 (step 202). Allocation component 132 then identifies a thread from thread pool 134 to perform an allocated task (i.e., generate an element) and obtains a thread identifier for the identified thread (step 204). After a thread identifier for the identified thread is obtained by allocation component 132, a first count is initialized by allocation component 132 (step 206). In one embodiment, the first count is initialized, such that the first count is a value equal to zero. Allocation component 132 determines whether the value of first count is less than a first quotient (decision 208). In this embodiment, the first quotient is calculated, or defined, by dividing a number of elements desired for a sequence of random numbers over a number of participating random number generators from the collection of random number generators 112 (i.e., N/K). In another embodiment, another condition can be implemented, such that subsequent operational steps as described herein may be performed, responsive to allocation component 132 determining whether the other condition is fulfilled.

If allocation component 132 determines that the value of the first count is not less than the first quotient ('no' branch, decision 208), then subsequent operational steps for generating random numbers in parallel are illustrated in FIG. 2B. If allocation component 132 determines that the value of the first count is less than the first quotient ('yes' branch, decision 208), then allocation component 132 initializes a second count (step 210). In this embodiment, the second count is initialized by setting the value of the second count to be equal to the thread identifier of the identified thread (e.g., an index value for the identified thread). Allocation component 132 determines whether a value of the second count is less than a number of participating random number generators in the collection of random number generators 112 (decision 212). If allocation component 132 determines that the value of the second count is not less than the number of participating random number generators in the collection of random number generators 112 ('no' branch, decision 212), then allocation component 132 increments the first count (step 218). If allocation component 132 determines that the value of the second count is less than the number of participating random number generators in the collection of random number generators 112 ('yes' branch, decision 212), then allocation component 132 receives a generated element from the identified thread (step 214). In this embodiment, the identified thread uses a specified one of the random generators from the collection for random number generators 112 to generate the element. After allocation component 132 receives the generated element from the identified thread, allocation component 132 updates the value of the second count (step 216). In this embodiment, the value of the second count is updated such that the value of the second count is equal to the current value of the second count plus the value of the number of threads in thread pool 134. After step 216, allocation component 132 continues to determine whether the updated value of the second count is less than the number of participating random number generators in the collection of random number generators 112, as described in decision 212. After step 218, allocation component 132 continues to determine whether the incremented first count is less than the first ratio, as described in decision 208.

After allocation component 132 determines that the value of the first count is not less than the first quotient ('no' branch, decision 208), then allocation component 132 initializes the second count (step 220). As previously described, the second count is initialized by setting the value of the second count to be equal to the thread identifier of the identified thread (e.g., a numerical index value for the identified thread). Allocation component 132 determines whether the value of the second count is less than a remainder (decision 222). In this embodiment, the remainder is calculated, or defined, by performing an operation involving a number of elements desired for a sequence of random numbers modulo a number of participating random number generators from the collection of random number generators 112 (i.e., N % K). If allocation component 132 determines that the value of the second count is less than the remainder ('yes' branch, decision 222), then allocation component 132 receives a generated element from the identified thread (step 224). As previously described, the identified thread uses one of the random generators from the collection for random number generators 112 to generate the element received by allocation component 132 in step 214. After allocation component 132 receives the generated element from the identified thread, allocation component 132 updates the value of the second count (step 226).

In this embodiment, the value of the second count is updated such that the value of the second count is equal to the current value of the second count plus the value of the number of threads in thread pool 134. In this embodiment, each element generated by identified threads, as described in steps 214 and 224 of FIGS. 2A and 2B, are associated with an index value. For example, each index value indicates an order in which allocation component 132 should store a respective random number in a destination vector of memory component 142, as described in greater detail with regard to FIGS. 4 and 5. The resulting sequence of uniformly distributed random numbers stored in a destination vector of memory component 142 is generated in parallel by thread pool 134 without any requirement of thread synchronization. In comparison, a flowchart illustrating operational steps for generating random numbers in parallel using a second algorithm with thread synchronization is presented in FIG. 3.

Pseudo-code for the operational steps illustrated in FIGS. 2A and 2B are presented in Table 1 below. In Table 1: t represents the thread identifier obtained by allocation component 132, as described in step 204 of FIG. 2A; i represents the first counter that can be initialized by allocation component 132, as described in step 206 of FIG. 2A and incremented by allocation component 132, as described in step 218 of FIG. 2A; N represents a desired number of elements for a sequence of random numbers to populate a vector u; K represents the number of participating random number generators from the collection of random number generators 112; j represents the second counter that can be initialized by allocation component 132, as described in step 210 of FIG. 2A and step 220 of FIG. 2B as well as updated by allocation component 132, as described in step 216 of FIG. 2A and step 226 of FIG. 2B; and T represents the number of threads in thread pool 134. Furthermore, with reference to FIGS. 2A, 2B, and Table 1, decision 208 is represented as a first conditional, i<N/K, decision 212 is represented as a second conditional: j<K, and decision 222 is represented as a third conditional, j<N % K.

TABLE 1

```
t = get_thread_id( );
for ( i = 0; i < N/K; ++i )
{
    for ( j = t; j < K; j += T )
    {
        u[i*K + j] = gen[j].next( );
    }
}
for ( j = t; j < N%K; j +=T )
{
    u[(N/K)*K + j] = gen[j].next( );
}
```

Figure 3:
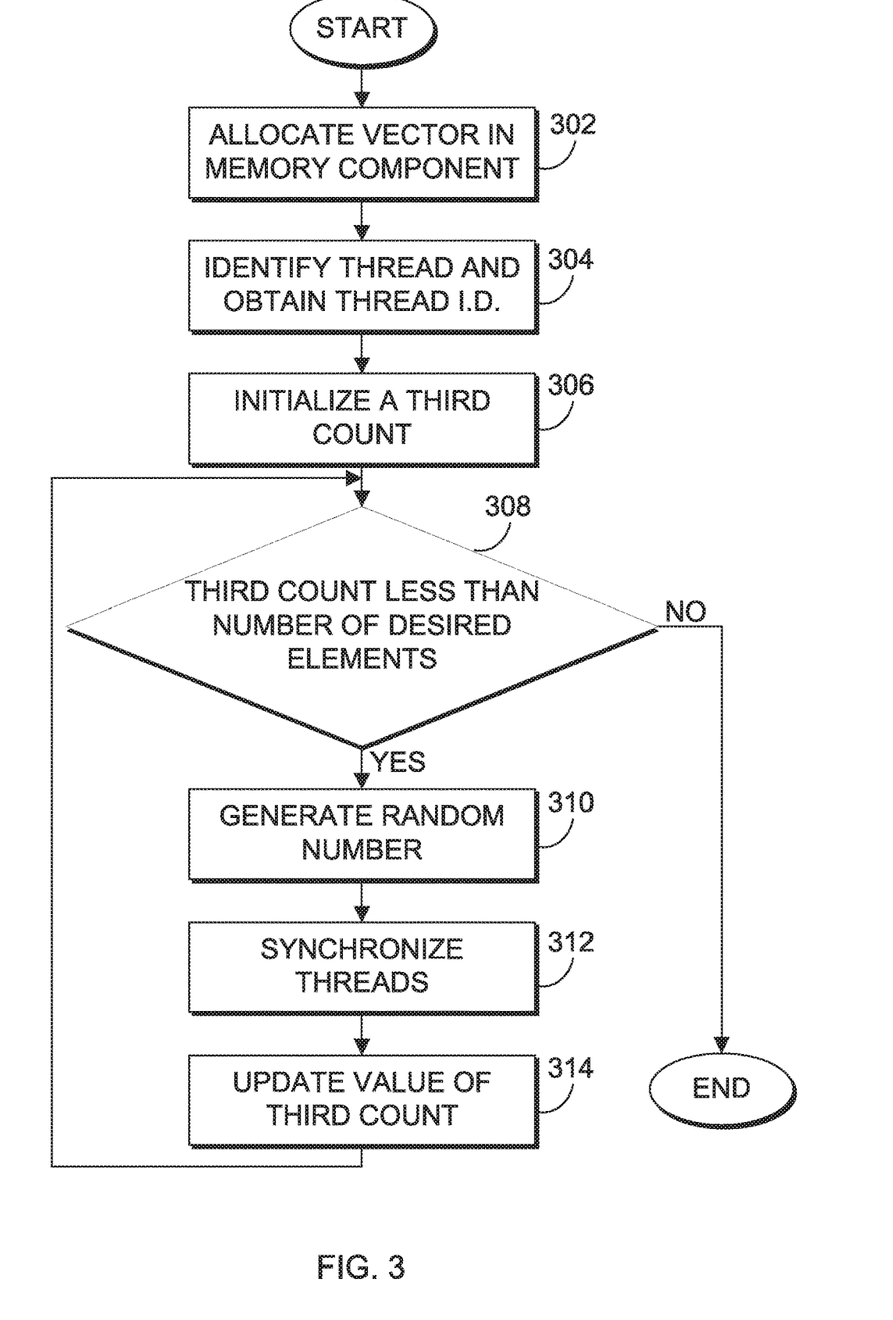
FIG. 3 is a flowchart illustrating operational steps for generating elements for a sequence of random numbers using thread synchronization, in accordance with an embodiment of the present invention.

FIG. 3 is a flowchart illustrating operational steps for generating elements for a sequence of random numbers in parallel with thread synchronization, in accordance with an embodiment of the present invention. In this embodiment, FIG. 3 illustrates operational steps for generating parallelized generation of random numbers using a second algorithm, having pseudo-code illustrated in Table 2 below. Allocation component 132 allocates a destination vector in memory component 142 (step 302). Allocation component 132 then identifies a thread from thread pool 134 to perform an allocated task (i.e., generate an element) and obtains a thread identifier for the identified thread, such as an index value for the identified thread (step 304). After a thread identifier for the identified thread is obtained by allocation component 132, a third count is initialized by allocation component 132 (step 306). In this embodiment, allocation component 132 initializes the third count by setting the value of the third count to be equal to the thread identifier of the identified thread (e.g., an index value for the identified thread). Allocation component 132 determines whether a value of the third count is less than a number of a desired number of elements for a sequence of random numbers to populate the allocated vector (decision 308).

If allocation component 132 determines that the value of the third count is less than the desired number of elements for the sequence of random numbers to populate the allocated vector ('yes' branch, decision 308), then allocation component 132 receives a generated element from the identified thread (step 310). In this embodiment, the identified thread uses one of the random generators from the collection for random number generators 112 to generate the element received by allocation component 132. After allocation component 132 receives the generated element from the identified thread, allocation component 132 synchronizes the threads in thread pool 134 (step 312). In one embodiment, thread synchronization can be performed using an intrinsic library call function. Once the threads in thread pool 134 are synchronized, allocation component 132 updates the value of the third count (step 314). In this embodiment, the value of the third count is updated such that the value of the third count is equal to the current value of the third count plus the value of the number of threads in thread pool 134. After step 314, allocation component 132 continues to determine whether the updated value of the third count is less than the desired number of elements for the sequence of random numbers to populate the allocated vector, as described in decision 308.

Pseudo-code for the operational steps illustrated in FIG. 3 is presented in Table 2 below. In Table 2: t represents the thread identifier obtained by allocation component 132, as described in step 304 of FIG. 3; i represents the third counter that can be initialized by allocation component 132, as described in step 306 of FIG. 3 and updated by allocation component 132, as described in step 314 of FIG. 3; N represents a desired number of elements for a sequence of random numbers to populate a vector u; K represents the number of participating random number generators from the collection of random number generators 112; and T represents the number of threads in thread pool 134. Furthermore, with reference to FIG. 3, and Table 2, decision 308 is represented a fourth conditional, i<N.

TABLE 2

```
t = get_thread_id( );
for ( i = t; i < N; i+=T )
{
    u[i] = gen[i%K].next( );
    synchronize_threads( );
}
```

Figure 4:
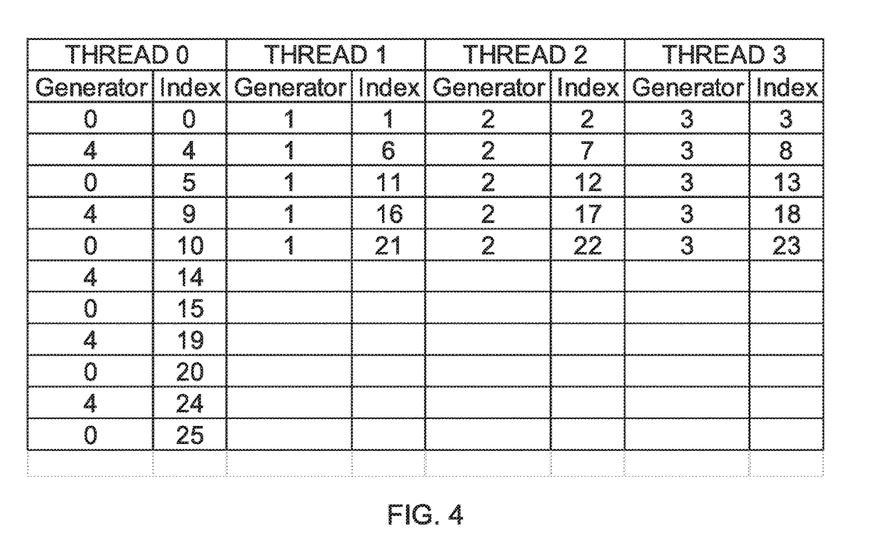
FIG. 4 is a table illustrating task distribution for threads of a computer system that perform operational steps described in FIGS. 2A and 2B to generate random numbers in parallel, in accordance with an embodiment of the present invention.

FIG. 4 is a table illustrating task distribution for threads of a computer system that perform operational steps described in FIGS. 2A and 2B, in accordance with an embodiment of the present invention. In this embodiment, threads in thread pool 134 do not require to be synchronized if random numbers are generated in parallel using the first algorithm described in FIGS. 2A and 2B. Accordingly, a number of tasks assigned for each thread varies, potentially resulting in a less than optimal load balancing for threads in thread pool 134. In comparison, a more optimal load balancing for threads in thread pool 134 is accomplished by generating random numbers in parallel using the second algorithm described in FIG. 3, as illustrated in FIG. 5.

In this embodiment, allocation component 132 allocates each thread from thread pool 134 (e.g., threads 0, 1, 2, and 3) at least one task that involves generating an element using a specified random number generator from the collection of random number generators 112. For example, allocation component 132 can allocate eleven tasks to thread 0 of thread pool 134, such that five of the eleven tasks involve thread 0 to generate five elements using a fifth random number generator from the collection of random number generators 112 and the remaining six of the eleven tasks involve thread 0 to generate six elements using a first random number generator from the collection of random number generators 112. As previously discussed, each generated random number is associated with an index value for a destination vector in memory component 142. For example, the first and second element generated by thread 0 is the first and fifth number appearing in a generated sequence of random numbers stored in a destination vector in memory component 142. In this embodiment, the sequence of random numbers that populate the destination vector in memory component 142 is complete once thread pool 134 (e.g., threads 0, 1, 2, and 3).

Figure 5:
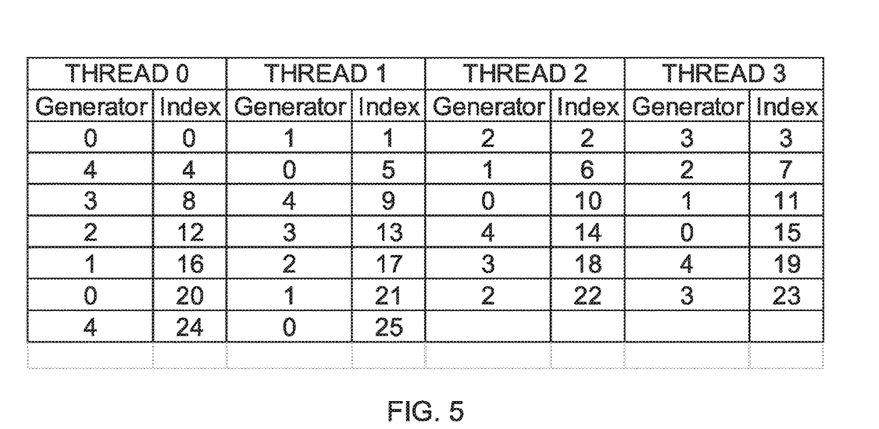
FIG. 5 is a table illustrating task distribution for threads of a computer system that perform operational steps described in FIG. 3 to generate random numbers in parallel, in accordance with an embodiment of the present invention.

FIG. 5 is a table illustrating task distribution for threads of a computer system that perform operational steps described in FIG. 3, in accordance with an embodiment of the present invention. In this embodiment, threads in thread pool 134 require to be synchronized if elements are generated in parallel using the second algorithm described in FIG. 3. For example, before thread 1 uses random number generator 0 to generate the fifth random number in a random number sequence, allocation component 132 is required to ensure that thread 0 completed the allocated task to generate the zeroth element using random number generator 0 in the previous cycle of computation. Accordingly, a number of tasks assigned is more uniformly distributed for each thread varies, resulting in increased load balancing for threads in thread pool 134.

Figure 6:
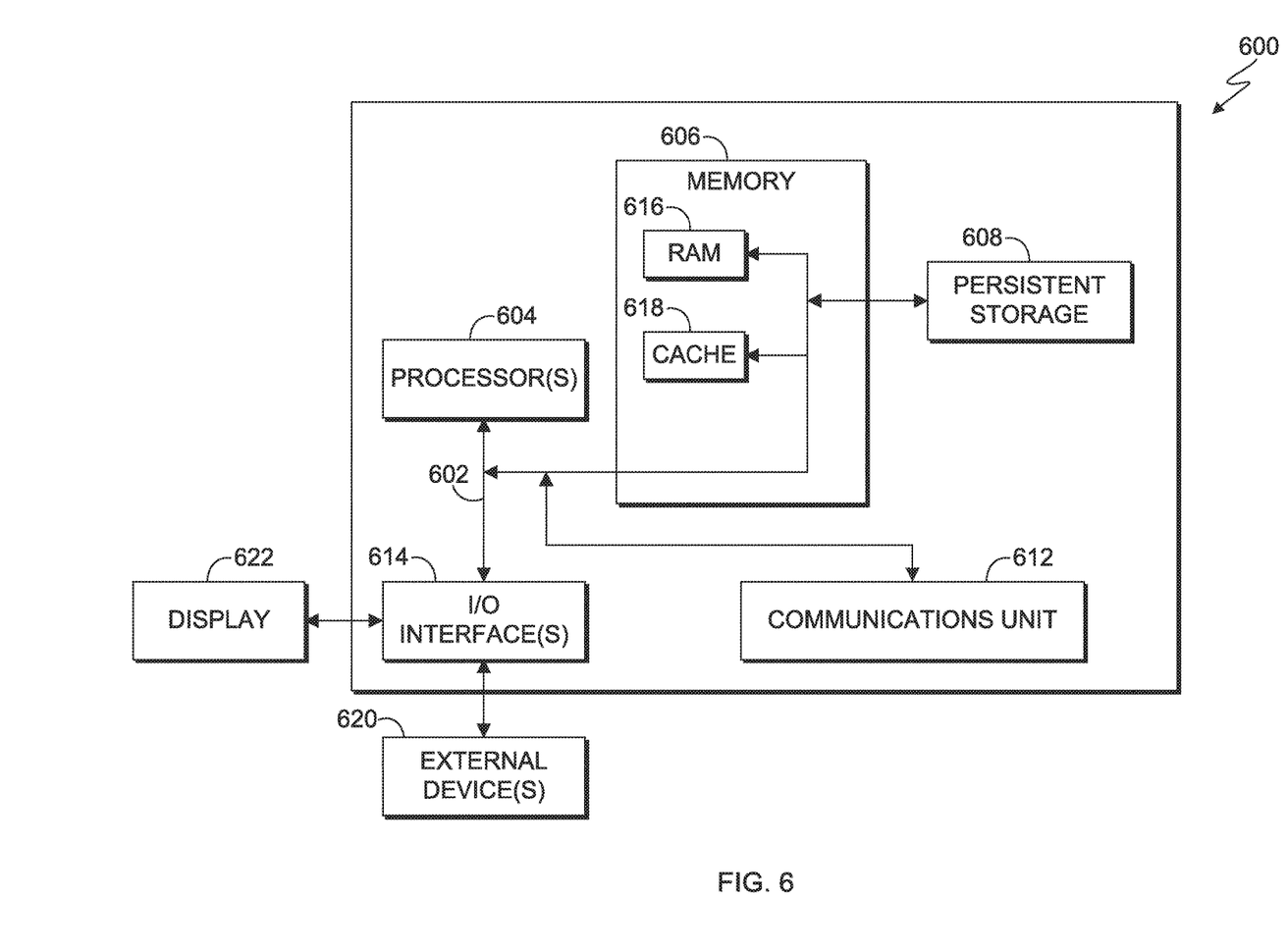
FIG. 6 is a block diagram of internal and external components of the computer systems of FIG. 1, in accordance with an embodiment of the present invention.

FIG. 6 is a block diagram of internal and external components of a computer system 600, which is representative the computer systems of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network (e.g., network 120). In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620, such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
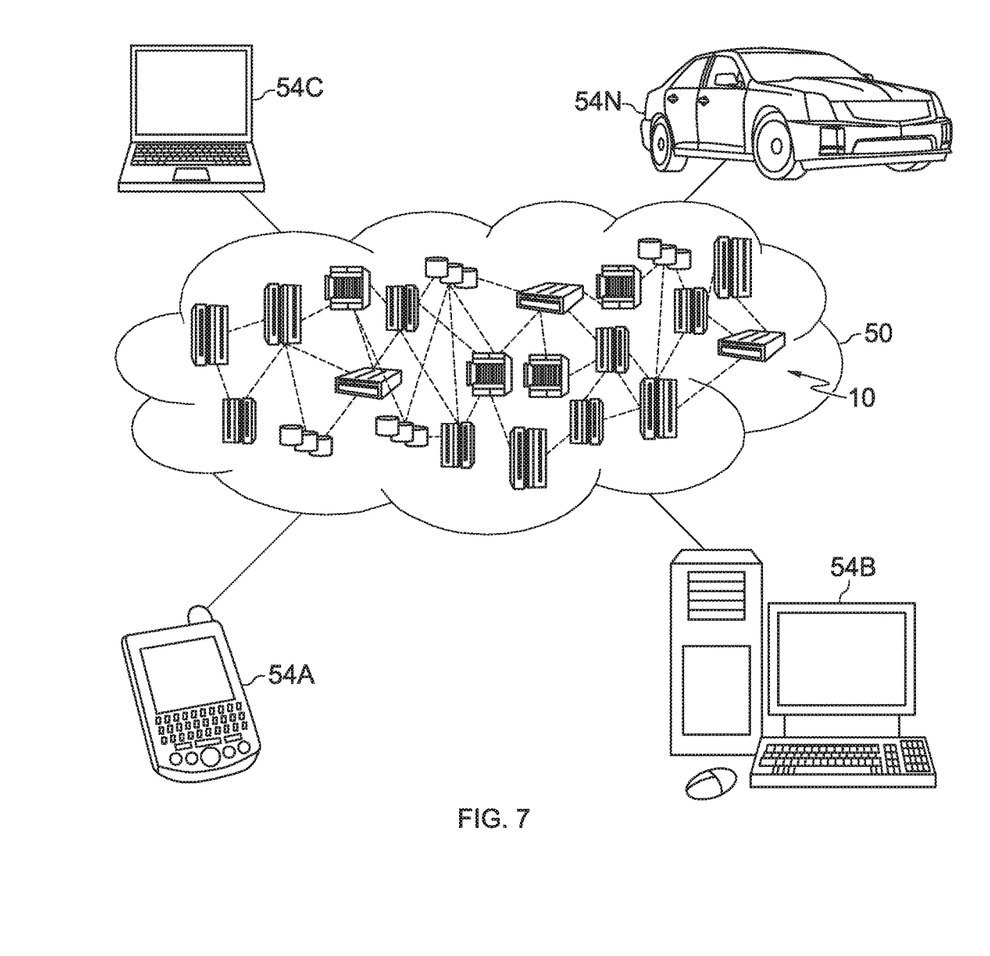
FIG. 7 depicts a cloud computing environment, in accordance with an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
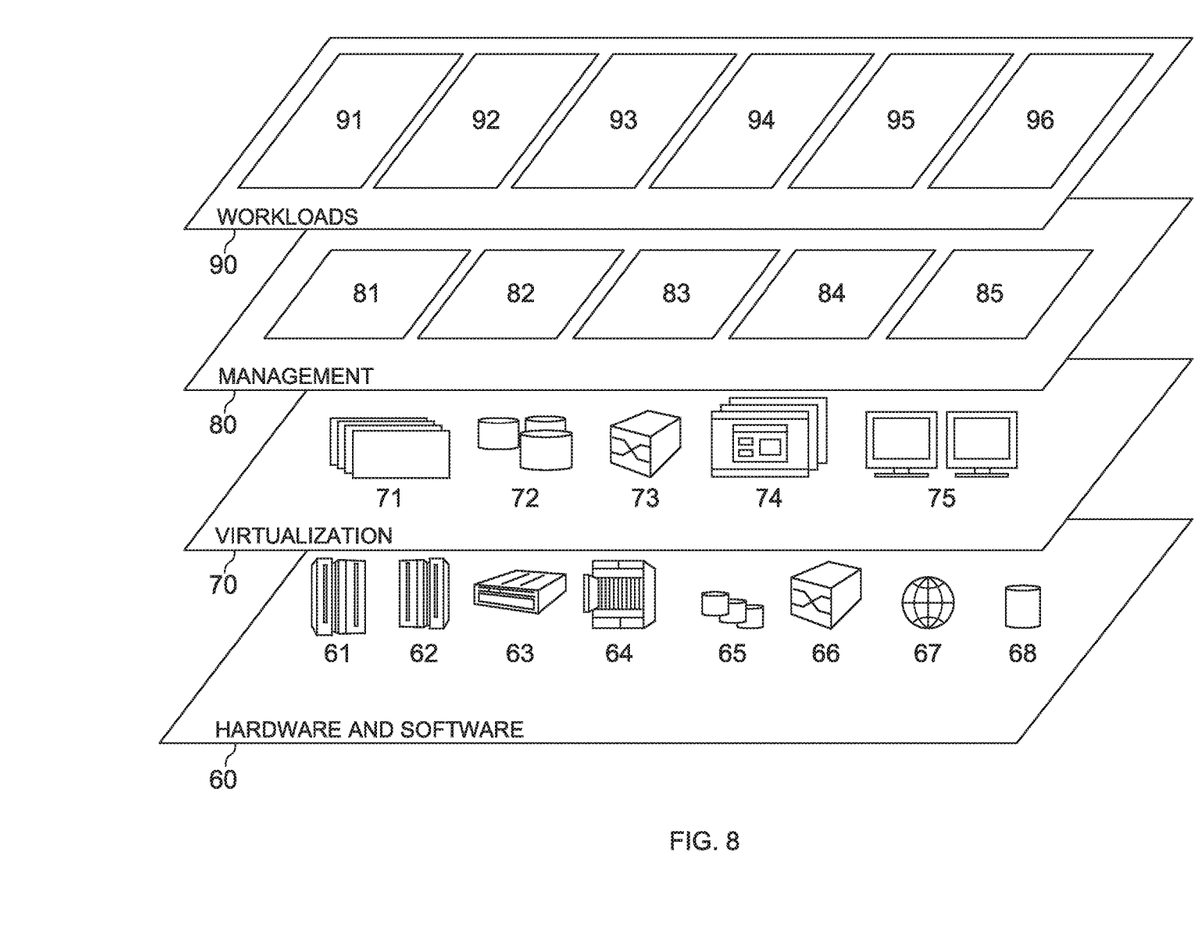
FIG. 8 depicts abstraction model layers, in accordance with an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and random number generation environment 96.

What is claimed is:

1. A method for parallelized generation of random numbers, the method comprising:
    allocating, by one or more computer processors, a vector, in a memory component, configured to store a sequence of random numbers;
    assigning, by the one or more computer processors, to a first thread of a plurality of threads, a first random number generator of a plurality of random number generators;
    assigning, by the one or more computer processors, to a second thread of the plurality of threads, a second random number generator of the plurality of random number generators;
    generating in parallel, by the first thread and the second thread, a first random number designated for a first index position in the sequence of random numbers and a second random number designated for a second index position in the sequence of random numbers, respectively;
    storing, by the one or more computer processors, in the allocated vector, the first random number in the first index position of the sequence of random numbers and the second random number in the second index position of the sequence of random numbers; and
    synchronizing, by the one or more computer processors, each of the plurality of threads to ensure uniform load balancing for each of the plurality of threads.

2. The method of claim 1, wherein the plurality of random number generators are a collection of Multiplicative Linear Congruential Generators (MLCGs).

3. The method of claim 1, wherein generating in parallel comprises:
    generating, by the one or more computer processors, the first and the second random numbers, based on whether a first count is less than a first quotient defined by a number of desired random numbers for the sequence of random numbers divided by a number of random number generators included in the plurality of random number generators;
    responsive to determining that the first count is less than the first quotient, determining, by the one or more computer processors, whether a second count is less than the number of random number generators included in the plurality of random number generators; and
    responsive to determining that the second count is less than the number of random number generators included in the plurality of random number generators, receiving, by the one or more computer processors, the first and the second random numbers to store in the allocated vector.

4. The method of claim 3, further comprising:
    responsive to determining that the first count is greater than the first quotient, determining, by the one or more computer processors, whether the second count is less than a remainder defined by an operation involving the number of desired random numbers for the sequence of random numbers modulo the number of random number generators included in the plurality of random number generators; and
    responsive to determining that the second count is less than the remainder, receiving, by the one or more computer processors, the first and the second random numbers to store in the allocated vector.

5. The method of claim 3, further comprising:
    initializing, by the one or more computer processors, the first count by setting the first count to a value equal to zero; and
    responsive to determining that the second count is greater than the number of random number generators included in the plurality of random number generators, incrementing, by the one or more computer processors, the first count.

6. The method of claim 3, further comprising:
    identifying, by the one or more computer processors, a thread identifier for the first thread and the second thread to assign the first and the second random number generators, respectively;
    responsive to determining that the first count is less than the first quotient for the first thread, initializing, by the one or more computer processors, the second count by setting the second count to a value equal to the thread identifier for the first thread;
    responsive to determining that the first count is less than the first quotient for the second thread, initializing, by the one or more computer processors, the second count by setting the second count to a value equal to the thread identifier for the second thread;
    responsive to determining for the first thread, the second count is greater than the number of random number generators included in the plurality of random number generators, updating, by the one or more computer processors, the value of the second count for the first thread; and
    responsive to determining that for the second thread, the second count is greater than the number of random number generators included in the plurality of random number generators, updating, by the one or more computer processors, the value of the second count for the second thread.

7. A computer program product for parallelized generation of random numbers, the computer program product comprising:
    one or more non-transitory computer readable storage media and program instructions stored on the one or more non-transitory computer readable storage media, the program instructions comprising:
    program instructions to allocate a vector, in a memory component, configured to store a sequence of random numbers;
    program instructions to assign to a first thread of a plurality of threads, a first random number generator of a plurality of random number generators;
    program instructions to assign to a second thread of the plurality of threads, a second random number generator of the plurality of random number generators;
    program instructions to generate in parallel, by the first thread and the second thread, a first random number designated for a first index position in the sequence of random numbers and a second random number designated for a second index position in the sequence of random numbers, respectively;
    program instructions to store in the allocated vector, the first random number in the first index position of the sequence of random numbers and the second random number in the second index position of the sequence of random numbers; and program instructions to synchronize, by the one or more computer processors, each of the plurality of threads to ensure uniform load balancing for each of the plurality of threads.

8. The computer program product of claim 7, wherein the plurality of random number generators are a collection of Multiplicative Linear Congruential Generators (MLCGs).

9. The computer program product of claim 7, wherein the program instructions to generate in parallel, comprise:

program instructions to generate the first and the second random numbers, based on whether a first count is less than a first quotient defined by a number of desired random numbers for the sequence of random numbers divided by a number of random number generators included in the plurality of random number generators;

program instructions to, responsive to determining that the first count is less than the first quotient, determine whether a second count is less than the number of random number generators included in the plurality of random number generators; and program instructions to, responsive to determining that the second count is less than the number of random number generators included in the plurality of random number generators, receive the first and the second random numbers to store in the allocated vector.

10. The computer program product of claim 9, wherein the program instructions stored on the one or more computer readable storage media further comprise:

program instructions to, responsive to determining that the first count is greater than the first quotient, determine whether the second count is less than a remainder defined by an operation involving the number of desired random numbers for the sequence of random numbers modulo the number of random number generators included in the plurality of random number generators; and program instructions to, responsive to determining that the second count is less than the remainder, receive the first and the second random numbers to store in the allocated vector.

11. The computer program product of claim 9, wherein the program instructions stored on the one or more computer readable storage media further comprise:

program instructions to initialize the first count by setting the first count to a value equal to zero; and program instructions to, responsive to determining that the second count is greater than the number of random number generators included in the plurality of random number generators, increment the first count.

12. The computer program product of claim 9, wherein the program instructions stored on the one or more computer readable storage media further comprise:

program instructions to identify a thread identifier for the first thread and the second thread to assign the first and the second random number generators, respectively;

program instructions to, responsive to determining that the first count is less than the first quotient for the first thread, initialize the second count by setting the second count to a value equal to the thread identifier for the first thread;

program instructions to, responsive to determining that the first count is less than the first quotient for the second thread, initialize the second count by setting the second count to a value equal to the thread identifier for the second thread;

program instructions to, responsive to determining for the first thread, the second count is greater than the number of random number generators included in the plurality of random number generators, update the value of the second count for the first thread; and program instructions to, responsive to determining that for the second thread, the second count is greater than the number of random number generators included in the plurality of random number generators, update the value of the second count for the second thread.

13. The computer program product of claim 7, wherein the program instructions stored on the one or more computer readable storage media further comprise:

program instructions to synchronize each of the plurality of threads to ensure uniform load balancing for each of the plurality of threads.

14. A computer system for parallelized generation of random numbers, the computer system comprising:

one or more computer processors;

one or more computer readable storage media;

program instructions stored on the one or more computer readable storage media for execution by at least one of the one or more processors, the program instructions comprising:

program instructions to allocate a vector, in a memory component, configured to store a sequence of random numbers;

program instructions to assign to a first thread of a plurality of threads, a first random number generator of a plurality of random number generators;

program instructions to assign to a second thread of the plurality of threads, a second random number generator of the plurality of random number generators;

program instructions to generate in parallel, by the first thread and the second thread, a first random number designated for a first index position in the sequence of random numbers and a second random number designated for a second index position in the sequence of random numbers, respectively;

program instructions to store in the allocated vector, the first random number in the first index position of the sequence of random numbers and the second random number in the second index position of the sequence of random numbers; and program instructions to synchronize, by the one or more computer processors, each of the plurality of threads to ensure uniform load balancing for each of the plurality of threads.

15. The computer system of claim 14, wherein the plurality of random number generators are a collection of Multiplicative Linear Congruential Generators (MLCGs).

16. The computer system of claim 14, wherein the program instructions to generate in parallel, comprise:

program instructions to generate the first and the second random numbers, based on whether a first count is less than a first quotient defined by a number of desired random numbers for the sequence of random numbers divided by a number of random number generators included in the plurality of random number generators;

program instructions to, responsive to determining that the first count is less than the first quotient, determine whether a second count is less than the number of random number generators included in the plurality of random number generators; and program instructions to, responsive to determining that the second count is less than the number of random number generators included in the plurality of random number generators, receive the first and the second random numbers to store in the allocated vector.

17. The computer system of claim 16, wherein the program instructions stored on the one or more computer readable storage media further comprise:
   program instructions to, responsive to determining that the first count is greater than the first quotient, determine whether the second count is less than a remainder defined by an operation involving the number of desired random numbers for the sequence of random numbers modulo the number of random number generators included in the plurality of random number generators; and
   program instructions to, responsive to determining that the second count is less than the remainder, receive the first and the second random numbers to store in the allocated vector.

18. The computer system of claim 16, wherein the program instructions stored on the one or more computer readable storage media further comprise:
   program instructions to initialize the first count by setting the first count to a value equal to zero; and
   program instructions to, responsive to determining that the second count is greater than the number of random number generators included in the plurality of random number generators, increment the first count.

19. The computer system of claim 16, wherein the program instructions stored on the one or more computer readable storage media further comprise:
   program instructions to identify a thread identifier for the first thread and the second thread to assign the first and the second random number generators, respectively;
   program instructions to, responsive to determining that the first count is less than the first quotient for the first thread, initialize the second count by setting the second count to a value equal to the thread identifier for the first thread;
   program instructions to, responsive to determining that the first count is less than the first quotient for the second thread, initialize the second count by setting the second count to a value equal to the thread identifier for the second thread;
   program instructions to, responsive to determining for the first thread, the second count is greater than the number of random number generators included in the plurality of random number generators, update the value of the second count for the first thread; and
   program instructions to, responsive to determining that for the second thread, the second count is greater than the number of random number generators included in the plurality of random number generators, update the value of the second count for the second thread.

* * * * *